Patented Mar. 8, 1932

1,848,946

UNITED STATES PATENT OFFICE

ALBERT GODEL, OF PARIS, FRANCE, ASSIGNOR TO SOCIETE DE RECHERCHES ET D' EXPLOITATIONS PETROLIFERES, OF PARIS, FRANCE, A FRENCH SOCIETE ANONYME

PROCESS OF ACTIVATING CARBON

No Drawing. Application filed December 29, 1927, Serial No. 243,345, and in France January 14, 1927.

Numerous processes for the activation of carbon are based upon the treatment of carbonaceous substances by means of gases at high temperature.

These processes differ as regards the particular conditions in which the operation of activation is carried out, so that in the preparation of carbons of the same activity by different methods from the same carbonaceous substance, the yield of active carbon may vary considerably.

The improvement forming the subject of the present invention, is applicable in a general manner to all known processes of activation of carbon by gases, whatever be the state of the primary material, that is, whether it be raw, natural or artificial, agglomerated, already carbonized wholly or in part, partially activated or not activated, and so on.

The novel treatment is based upon an impregnation of the product to be activated, the impregnation being carried out with very small doses (1 to 5% under normal conditions) of bases, salts or acids, possessing fireproofing properties, these substances being employed in the pure state or in mixture.

It has already been proposed to use bases, salts or acids, having dehydrating, carbonizing, oxidizing and other actions, of greater or less degree, for the direct activation by carbonizing in closed vessels of raw carbonaceous materials, such as peat, saw-dust, leather waste, etc., but in all cases without the aid of activating gases, for the activating action was due to the bases, salts or acids, and not to gases.

Such processes are applicable only to raw or incompletely carbonized primary materials, since the chemical agents utilized operate mainly during carbonization and would not produce any effect upon products already carbonized in the ordinary manner.

Moreover, these processes require a high proportion of the chemical agent used for activating (for example 50 to 100 per cent) in order to produce an appreciable activation; doses as low as those mentioned above would not give any appreciable activation.

There has also been suggested the use of certain acids, bases or salts, with a view to the activation of materials already coked, but the suggestion did not reach an industrial application because it was due to a complete misunderstanding of the causes of the phenomenon observed. As a matter of fact, it is practically impossible to avoid the entrance of air or of burnt gases at high temperature into the retorts; for the latter are often porous or imperfectly gas-tight at red heat, so that the very feeble activation observed in that case must be attributed mainly to such gases and not to the action of the chemical agents upon the carbonaceous matter; assuming it to be a fact that the latter had been completely carbonized prior to the use of the chemical actifying agent.

Moreover, it is known to mix more or less intimately with the carbonaceous matter, such substances as lime, carbonate of magnesia, volatile chlorides etc., intended to evolve activating gases, like carbonic acid gas, chlorine, and in some cases oxygen, which assist the activation, in combination with activating gases which can be introduced in addition into the retorts. These substances are likewise employed in fairly large proportions, 50 to 100 per cent, and they serve also as spacing agents to help the activation.

From the foregoing statements, it can readily be understood that the chemical agents utilized hitherto for the activation of carbon, with or without the aid of gases, have an action totally different from that sought in the present invention.

I have observed that slight traces of various impurities in the primary carbonaceous matter are capable of modifying considerably its activation by the gases; these impurities, for example in the case of wood, charcoal, etc., are constituted by ashes which have an important influence upon the said activation.

The present improvement consists then in incorporating in the material, previous to its activation or in the course of the activation, a suitable but always very low proportion of a suitable impregnating agent, for example by macerating the charcoal in a titrated solution of the substance selected, or else by introducing the said substance either in the dry and pulverulent state, or in the liquid state, atomized or not, into the mass of carbon, for example in the course of the treatment of agglomeration.

Thus, there will be obtained according to the present invention an active carbon, excellent for the absorption of gases, by impregnating wood charcoal, in natural granules or artificially agglomerated, with an agent consisting of phosphoric acid, boric acid, borate of soda, carbonate of soda, bisulphate of soda, caustic soda, alkali phosphates, silicate of soda, etc., this carbon being subjected after drying to a treatment of activation by activating gases at high temperature.

For a given activity, the product above mentioned will be denser, harder, less black and less friable than the product obtained without the preliminary impregnation.

According to experiments carried out, it seems that the action of certain impregnating agents in the activation of carbon must be attributed to their more or less fire-proofing properties, the bodies capable of giving rise to fusible compounds at the activation temperature appearing to assist the activation as regards yield and the properties generally required for the absorption of gases.

The action of the fire-proofing agents might be explained in the following manner;

Certain inactive carbons, wood charcoal for example, may be considered as constituted by a skeleton of active carbon, of which the capillary pores are saturated with tars or heavy hydrocarbons evolved during the carbonization of the wood. The processes of activation by gases have for effect to destroy these tars or hydrocarbons by selective oxidation while leaving intact the skeleton of active carbon.

In practice, however great be the care taken in the activation, there is inevitably a destruction of a part of the active carbon by combustion.

Now, if the carbon is first impregnated with a substance fusible at the activation temperature, it can easily be understood that this substance penetrates throughout the free active carbon, and that the fused material is the more thoroughly absorbed by the particles of carbon in proportion as the latter are more active. On the contrary, the inactive particles of carbon, the hydrocarbons of the charcoal, etc., are not moistened or impregnated by the fused substance when ignited; those particles are left freely exposed to the oxidizing action of the gases, whereas the active carbon is protected.

Another phenomenon can likewise take place if the material to be activated is slightly heterogeneous, like wood charcoal for example, of which the sap wood is softer and more rapidly activated than the heart wood; the soft and generally spongy part will retain a higher proportion of the impregnating substance than the hard portion, so that by protection of the soft parts there will be obtained a regularization of the speed of activation consequently an improvement in the yield.

Thus, in the application of the invention, success has been obtained in activating with an excellent yield the waste or powder of wood charcoal, whereas with all the processes now in use such an operation could not be carried out profitably owing to the variety of the nature of the fragments of carbon, which are constituted sometimes by the bark, sometimes by the sap wood and sometimes by the heart-wood.

It may be noted that it is impossible to interpret the action of the impregnating agents mentioned as an action of transitory oxidation, the impregnating agent playing always the part of intermediary between the previously carbonized charcoal which would be oxidized while being activated by contact, and the gases which would regenerate the impregnating agent by oxidation; in fact the same impregnating substances employed even in strong doses but without the assistance of activating gases are absolutely without any action, although they may be for example of an oxidizing nature, like phosphoric acid. On the contrary, if the operation is carried out in an atmosphere of activating gases, phosphoric acid employed even in very small doses increases the yields and the activities because it is of a fire-proofing nature.

The fire-proofing properties of certain stances have already been utilized in the carbonizing of organic materials with a view to obtaining incombustible carbon (see French patent specification No. 162,282, filed May 21st 1884).

It has also been proposed to impregnate active carbon with small quantities of phosphoric acid in order to render it incombustible (see German patent specification No. 374,208, filed September 6th 1921), but it is to be noted that the impregnation of the carbon has never been utilized hitherto for the manufacture of active carbon.

The impregnation of carbonaceous substances in accordance with the invention can be carried out in various ways.

There has been mentioned above the maceration of the carbon in a titrated aqueous solution of the impregnating substance; the operation may likewise be carried out in the manner indicated hereafter, which will be particularly applicable in the preparation of moulded active carbons intended for the absorption of gases.

The carbon to be agglomerated (active or inactive) is ground to an impalpable powder which is then mixed up with a binder, such as sugar, bisulphite cellulose-liquor, coal tar, wood tar, oxidized tars, dextrine, algine, gum arabic, iron gels, alumina, sulphate of lime, etc., according to the methods practised in the agglomerated coal industry.

Moreover, and in accordance with the invention, there is incorporated with the paste a small proportion of the fire-proofing bodies already mentioned; phosphoric acid, boric acid, borate of soda, carbonate of soda, bisulphate of soda, caustic soda, silicate of soda, or any other fire-proofing substance, employed alone or in mixture; the moulded product is then dried, calcined and activated by known processes.

There will thus be obtained a very great improvement in the properties of the agglomerated active carbon obtained and in particular a considerable increase in its strength and density. In order to increase the said propertes still further if necessary, the following procedure may be adopted:—

Carbon, impregnated or agglomerated with organic substances, and coked by the usual known methods, with or without addition of the impregnated substance, will be ground up into an impalpable powder; this powder, after the second pulverization, will have a greater density than that obtained from the initial carbon and will be employed advantageously for the preparation of fresh agglomerates, with or without addition of impregnating substances; the dried, calcined and activated agglomerates, coated if necessary by known processes, will constitute a carbon of very high value due to its great density and strength.

In all cases there may naturally be adopted measures for eliminating ashes from the carbon by washings after activation; this will not always be necessary in view of the small proportion of impregnating substances utilized.

What I claim is:—

1. In the preparation of carbon to be activated by means of gases, the steps of subjecting the material, to an impregnation with not more than 5% in dry weight of fire-proofing substance, and subsequently activating the impregnated material by heating and oxidizing by means of gases at high temperature.

2. In the preparation of agglomerated carbon to be activated by means of gases, the step of agglomerating and simultaneously impregnating the material with from 1% to 5% in dry weight of a fire-proofing agent, and subsequently heating said material by means of activating gases at high temperature.

3. Process for the preparation of agglomerated absorbent carbon, comprising the steps of grinding the material to be activated into an impalpable powder, mixing said powder with a binder to form an agglomerated paste, impregnating said paste with not more than 5% in dry weight of a fire-proofing agent, moulding the impregnated paste, drying, calcining the moulded product, and subjecting the same to treatment by activating gases at high temperature.

4. Process for the preparation of agglomerated absorbent carbon, comprising the steps of grinding the material to be activated into an impalpable powder, mixing said powder with a binder to form an agglomerated paste, impregnating said paste with not more than 5% in dry weight of a fire-proofing agent, molding said paste, drying, calcining the molded product, grinding said calcined product into an impalpable powder, mixing said powder with a binder to form a second agglomerated paste, molding said second paste, drying and calcining said second molded product, and subjecting the same to a treatment by activating gases at high temperature.

5. Process for the preparation of agglomerated absorbent carbon, comprising the steps of grinding the material to be activated into an impalpable powder, mixing said powder with a binder to form an agglomerated paste, molding said paste, drying, calcining the molded product, grinding said calcined product into an impalpable powder, mixing said powder with a binder to form a second agglomerated paste, impregnating one of said agglomerated pastes with not more than 5% in dry weight of a fire-proofing agent, molding said second paste, drying said second molded product, and subjecting the same to a treatment by activating gases at high temperature.

6. In the course of the preparation of carbonaceous material to be activated by means of gases, the step of subjecting the material to an impregnation with from 1% to 5% in dry weight of fire-proofing substance, the impregnated material being subsequently carbonized and activated by oxidizing gases at high temperature.

In testimony whereof I hereunto affix my signature.

ALBERT GODEL.